(12) United States Patent
Boulet D'Auria

(10) Patent No.: US 8,978,709 B2
(45) Date of Patent: Mar. 17, 2015

(54) DEVICE FOR SEALING A LEAK IN A FLUID-TRANSPORT PIPE

(75) Inventor: Stanislas Boulet D'Auria, Monaco (FR)

(73) Assignee: 3X Engineering, Monaco (MC)

( * ) Notice: Subject to any disclaimer, the term of this patent is extended or adjusted under 35 U.S.C. 154(b) by 154 days.

(21) Appl. No.: 13/992,176

(22) PCT Filed: Dec. 6, 2011

(86) PCT No.: PCT/FR2011/052877
§ 371 (c)(1),
(2), (4) Date: Jun. 6, 2013

(87) PCT Pub. No.: WO2012/076803
PCT Pub. Date: Jun. 14, 2012

(65) Prior Publication Data
US 2013/0264815 A1 Oct. 10, 2013

(30) Foreign Application Priority Data
Dec. 7, 2010 (FR) ..................................... 10 04758

(51) Int. Cl.
F16L 55/16 (2006.01)
F16L 55/172 (2006.01)
(52) U.S. Cl.
CPC .................................. F16L 55/172 (2013.01)
USPC ............................................... 138/99; 138/97
(58) Field of Classification Search
CPC ........................... F16L 55/172; F16L 55/1705
USPC ....................................... 138/99, 97, 98; 24/279
See application file for complete search history.

(56) References Cited

U.S. PATENT DOCUMENTS

| | | | | | |
|---|---|---|---|---|---|
| 785,737 | A | * | 3/1905 | Jones | 138/99 |
| 2,069,722 | A | * | 2/1937 | Merrill | 138/99 |
| 2,529,411 | A | * | 11/1950 | Northrup | 138/99 |
| 4,606,377 | A | * | 8/1986 | Montgomery | 138/99 |
| 5,247,967 | A | * | 9/1993 | Bourque | 138/99 |
| 5,497,808 | A | * | 3/1996 | Schlund et al. | 138/99 |
| 5,706,862 | A | * | 1/1998 | Meinerding, Sr. | 138/99 |
| 5,988,224 | A | | 11/1999 | D'Auria | 138/99 |
| 6,334,465 | B2 | | 1/2002 | Boulet D'Auria | 138/99 |
| 7,370,676 | B2 | | 5/2008 | Boulet d'Auria et al. | 138/99 |
| 7,992,594 | B2 | * | 8/2011 | Bowie | 138/99 |

FOREIGN PATENT DOCUMENTS

DE 78 286 6/1894

* cited by examiner

Primary Examiner — Patrick F Brinson
(74) Attorney, Agent, or Firm — James C. Lydon

(57) ABSTRACT

A device for sealing a leak in a pipe (10) having at least one hole or crack (12), including an elastomer plate (14) applied to the leak site by a force distributor (16), and a tightening strap (20, 22) arranged around the pipe in order to apply a force onto the force distributor. The force distributor includes a support grid and separate force modules, each of the modules being placed so as to be slidable in one of the units of the grid and arranged perpendicular to the pipe so as to apply shear forces to the elastomer plate at the leak site, forcing the elastomer to deform so as to closely match the concave or convex shape of the pipe at the leak site and thus to seal the hole or crack.

6 Claims, 3 Drawing Sheets

DEVICE FOR SEALING A LEAK IN A FLUID-TRANSPORT PIPE

The present invention relates to the repair of pipes transporting water, gas and other fluids, and particularly a device for sealing a leak in a pipe.

Various techniques can be used to repair a leaking water or gas pipe. A very common technique consists in sealing the leak by applying an elastomer to the holes or cracks in the pipe using a sleeve. Such a sleeve is formed by two half-shells, the inner wall of which is made of elastomer and adapted to surround the pipe at the site of the cracks. The half-shells are secured together and tightened onto the pipe by threaded rods or other means.

Unfortunately, sealing leaks with this type of sleeve presents numerous drawbacks. Considerable force must be applied while tightening the sleeve so the elastomer exerts a pressure greater than that of the fluid inside the pipe, which may sometimes reach pressures up to 100 bar. The application of a significant clamping force may sometimes create new cracks if the operation is performed incorrectly. Furthermore, the half-shells used to shape the sleeve are adapted to a specific diameter of pipe, thus requiring as many diameters of shells as there are pipe diameters.

Another technique, described in patent FR 2.782.367, consists in using an elastomer plate applied to the site of the leak by a force applicator and a tightening strap tightened around the pipe to apply a clamping force to the force applicator. This force applicator is a rectangular plate in the form of a lattice featuring rigid partitions arranged perpendicularly to the surface of the pipe and intended to apply shear forces onto the elastomer plate at the site of the leak.

Although efficient, the device mentioned above presents numerous drawbacks. As a matter of fact, although the force applicator is made of plastic material, and therefore able to withstand deformation, its excessive stiffness prevents it from adapting to a crack in the pipe where a significant difference in height is present. This is the case when the leak is at the site of a convex weld or at the site of a corrosion pit that appears as a cavity of a certain depth in the pipe. In these two cases, the stiffness of the force applicator prevents it from deforming enough to match the contours of the hole or the crack at the site of the leak, even when a considerable clamping force is applied.

This is why the purpose of the invention is to provide a device for sealing a leak in a pipe that is rapid to implement and does not require considerable clamping force.

Another purpose of the invention is to provide a device for sealing a pipe capable of adapting to the concave or convex shape of the pipe at the site of the leak.

The subject of the invention is thus a device for sealing a leak in a pipe having at least one hole or crack, including an elastomer plate applied against the site of the leak by a force distributor and a tightening strap placed around the pipe in order to apply a force to the force distributor. The force distributor consists of a support grid and separate force modules, each of which being placed in a sliding manner into one of the meshes of the grid and arranged perpendicularly to the pipe so as to apply shear forces to the elastomer plate at the site of the leak, forcing the elastomer to deform so as to match the concave or convex shape of the pipe at the site of the leak and thus to seal the hole or crack.

The purposes, objects and other characteristics of the invention will become more apparent from the following description when taken in conjunction with the accompanying drawings in which.

Figure 1:
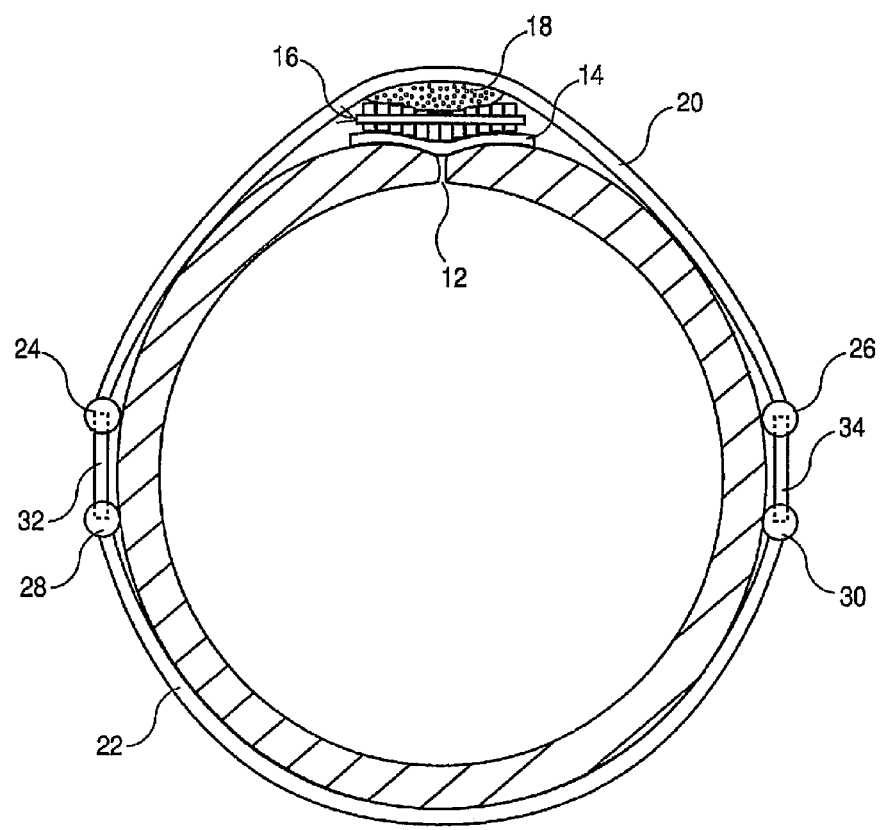
FIG. 1 represents a pipe having a concave shape at the site of the leak on which the device for sealing a leak, according to the invention, is installed.

FIG. 1 represents a cross-sectional view of a pipe 10 intended to transport a fluid such as a liquid or a gas, and having a leak caused by a hole or a crack 12 in the upper part of the pipe. The hole or the crack is located in a cavity or a concave part of the pipe due to corrosion. At the site of the leak, the sealing device includes an incompressible and deformable elastomer plate 14 and having good creep resistance, such as rubber or neoprene. This layer, having a thickness between 0.3 cm and 3 cm, is designed to stop the leak by penetrating by pressure into the upper part of the hole or crack.

A force distributor 16, described below, is placed on top of the elastomer plate 14. The distributor 16 has approximately the same dimensions as that of the elastomer plate 14 and is designed to apply and distribute the shear forces on the elastomer plate 14.

A pressure distributor 18, placed on top of the force distributor 16, is intended to distribute the pressure resulting from the clamping forces generated by the tightening of a strap comprised of two strap portions 20 and 22. The advantage of the strap is to avoid generating excessive stresses in the wall of the pipe. Each clamping element extends between two end rods 24 and 26 for strap portion 20, and end rods 28 and 30 for strap portion 22. The end rods 24 and 28 are connected by a threaded rod 32 and the end rods 26 and 30 are connected by a threaded rod 34. When rotated, the threaded rods are progressively introduced into the bores of the end rods of the strap portions and tighten the strap around the pipe 10. As tightening continues, shear forces are applied to the elastomer plate 14 thereby sealing the crack 12.

Figure 2:
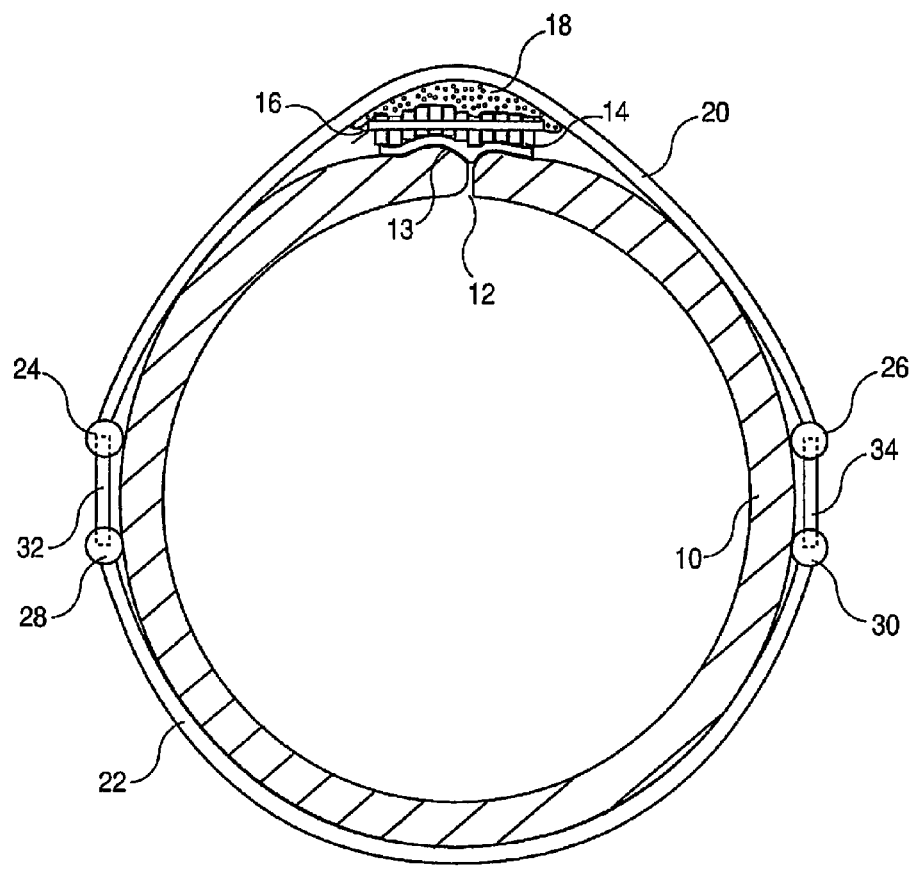
FIG. 2 represents a pipe having a convex shape at the site of the leak on which the device for sealing a leak, according to the invention, is installed.

FIG. 2 represents the device according to the invention applied to a pipe for the purpose of sealing a leak caused by hole or a crack 12 located near a weld 13. As described below, the force distributor 16 adapts perfectly to the variations in the height of the pipe due to the weld 13 and the dished area that follows due to the hole or the crack. As in the case of FIG. 1, a pressure distributor 18 is placed on top of the force distributor 16 for the purpose of distributing the clamping forces created by the tightening of the strap consisting of two strap portions 20 and 22.

Figure 3:
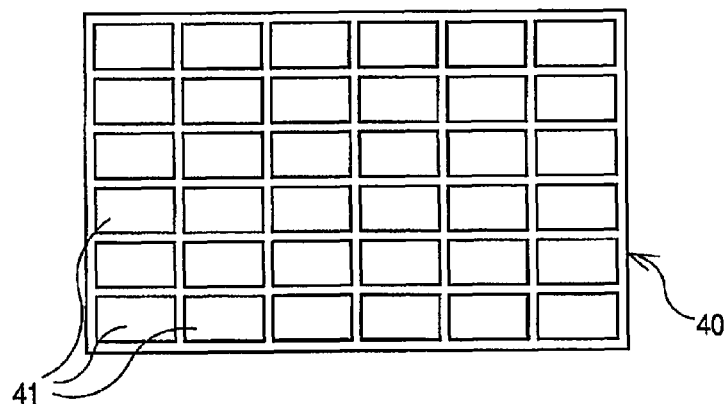
FIG. 3 represents the grid serving as a support for the force modules of the force distributor.
Figure 4:
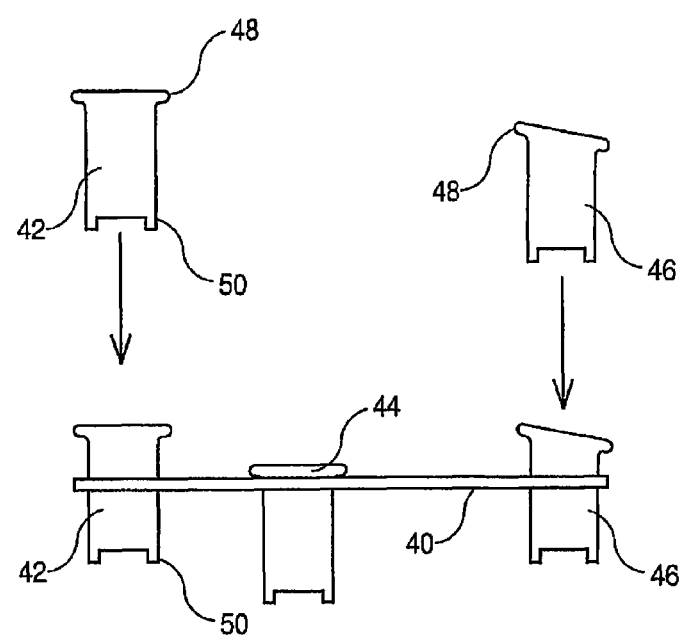
FIG. 4 represents the support grid and several modules of different shape, more or less introduced into the meshes of the grid.

In reference to FIGS. 3 and 4, the force distributor is a rectangular-shaped support grid 40, the size of which is adapted to the dimensions of the hole or crack. The partitions of the grid have a depth of 2 mm and a thickness lower than 1 mm. The grid is preferably made of a rigid yet deformable plastic such as polyamide, polypropylene or polycarbonate, or is made of metal having the same deformability characteristics, namely aluminium. The deformability of the grid 40 thus allows the same force distributor to be used regardless of the diameter of the pipe to be sealed.

A force module 42, 44 or 46, illustrated in FIG. 4, is inserted into each of the meshes 41 of the grid 40. Each force module has a rectangular cross-section slightly smaller in size than that of the cell so that the module can be introduced into the mesh. The module preferably includes a rim 48 so that it is retained by the grid when introduced into the mesh. Each module measures between 5 mm and 40 mm in height.

As can be seen in FIGS. 1 and 2, the force modules are introduced into the grid in a sliding manner and extend above the grid by a height that depends on the height variations of the pipe at the site of the leak. Thus, in FIG. 1, the force modules are introduced deeper into the grid at the centre of the site where the hole or the crack is located as it is a concave part. However, in FIG. 2, the modules are introduced less deeply into the grid at the site of the weld 13 which is a convex part of the pipe.

As a result, the force distributor 16, formed by the grid 40 and modules 42, 44 or 46, adapts perfectly to all shapes of the pipe at the site of the leak.

It should be noted that the grid may be of any shape other than triangular and that the meshes of the grid are not necessarily rectangular in shape.

Each force module 42, 44 or 46 includes, at its lower end, a rib on at least one side of the module, and preferably on all sides, so as to form a rectangle, for the purpose of exerting shear forces perpendicularly to the elastomer plate 14.

According to a variant, the modules may have a different height, increasing gradually from the edge of the grid toward its centre so that the force distributor 16 has a general convex shape adapted to the tightening strap. In this case, the upper end of each module is preferably inclined as illustrated for module 46 shown in FIG. 4, this inclination being increasingly small from the edges of the grid toward the centre of the grid.

The purpose of the pressure distributor 18, placed on top of the force distributor 16, is to uniformly distribute the pressures exerted by the tightening strap on the force distributor 16 and in particular on the ends of the force modules which, as seen above, are not at the same height since the surface of the pipe varies in height owing to the concave or convex shape at the site of the leak. According to a preferred characteristic of the invention, the pressure distributor 18 is a bag containing plastic or metal beads whose size (or diameter if spherical) is less than 5 mm in size, so that the bag of beads can adapt to the slightest protrusion of the force distributor and fill in the spaces and gaps between the ends of the pressure modules.

While the description presents a preferred embodiment of the invention, it is clear that modifications can be made without deviating from the scope of the invention. All types of clamping mechanisms can thus be used to implement the invention. However, using two strap portions (illustrated in FIGS. 1 and 2) and, generally speaking, several strap portions interconnected by appropriate clamping means bringing the ends of the strap portions closer together when tightened (these clamping means may notably be threaded rods as described in the preferred embodiment), provides a system that can be adapted to all diameters of pipe, each pipe possibly requiring the use of several identical strap portions connected together. Furthermore, it would be advisable that the strap portions that make up the strap be sheathed so that part of the tightening force are not absorbed by friction forces as is the case when the strap portions rub directly on the pipe during the tightening operation.

The invention claimed is:

1. A device for sealing a leak in a pipe (10) having at least one hole or crack (12), including an elastomer plate (14) applied against the site of the leak by a force distributor (16) and a tightening strap (20, 22) placed around the pipe in order to apply a force to said force distributor;

said device being characterised in that said force distributor consists of a support grid (40) that includes rectangular-shaped meshes and separate force modules (42, 44 or 46), each of said modules being placed in a sliding manner into one of the meshes of said grid and arranged perpendicularly to the pipe so as to apply shear forces to said elastomer plate at the site of the leak, forcing the elastomer to deform so as to match the concave or convex shape of the pipe at the site of the leak and thus to seal the hole or crack.

2. The device according to claim 1, wherein said pressure distributor (18) is a bag containing beads less than 5 mm in size.

3. The device according to claim 1, wherein said support grid is rectangular in shape and includes rectangular-shaped meshes and includes rectangular-shaped meshes.

4. The device according to claim 3, wherein each of said force modules (42, 44 or 46) includes, at its lower end, a rib on at least one side of the module, for the purpose of exerting shear forces perpendicularly to the elastomer plate (14).

5. The device according to claim 3, wherein each of said force modules (42, 44 or 46) includes at least a rim (48) so as to be retained by the grid when the module is introduced into the mesh.

6. The device according to claim 3, wherein said force modules (46) are of different height, this height increasing gradually from the edge of the grid toward its centre so that the force distributor (16) has a general convex shape adapted to the tightening strap (20, 22).

\* \* \* \* \*